Feb. 12, 1957 J. G. SPRACKLEN 2,781,492

CONTROLLABLE REACTIVE CURRENT SYSTEMS

Filed Aug. 29, 1955 3 Sheets-Sheet 1

JOHN G. SPRACKLEN
*INVENTOR.*

BY John J. Pederson

HIS ATTORNEY.

JOHN G. SPRACKLEN
*INVENTOR.*

BY John J. Pederson
HIS ATTORNEY.

Feb. 12, 1957 J. G. SPRACKLEN 2,781,492

CONTROLLABLE REACTIVE CURRENT SYSTEMS

Filed Aug. 29, 1955 3 Sheets-Sheet 3

JOHN G. SPRACKLEN
*INVENTOR.*

BY John J. Pederson
HIS ATTORNEY.

United States Patent Office 2,781,492

Patented Feb. 12, 1957

2,781,492

CONTROLLABLE REACTIVE CURRENT SYSTEMS

John G. Spracklen, Chicago, Ill., assignor to Zenith Radio Corporation, a corporation of Illinois Application August 29, 1955, Serial No. 531,160

8 Claims. (Cl. 332—24)

This invention is directed to a new and improved controllable reactive-current device of the type generally referred to as a reactance tube and to electrical systems using such devices.

In many electrical systems, it is desirable to provide means for controlling the phase and/or frequency of a given signal. For example, in many types of apparatus it is necessary to employ an oscillator which must be precisely controlled in frequency, whether the objective be to maintain a constant frequency or to modulate the oscillator frequency in accordance with information signals. Thus, in a frequency or phase modulation system of communication, the frequency or phase of an oscillator is modulated with control signals in order to transmit information from one point to another, In other apparatus, such as color television receivers, it is necessary to subject an oscillator to exacting control frequency-wise and to synchronize it in phase and frequency with a comparison signal. In other applications, it may be desirable to vary the phase of a particular signal for other purposes.

In all of these systems, phase or frequency control is frequently obtained by means of a reactance tube, which may be defined as an electric discharge device coupled into a circuit and utilized to adjust the operating characteristics of that circuit by conducting variable amounts of reactive current. Usually, such a system employs a pentode or a similar grid-control device which is coupled into the circuit in such a way that it effectively constitutes either a capacitive or an inductive reactance. The operating potentials of the tube are adjusted to provide a predetermined flow of reactive current under given conditions and the current amplitude is then varied to provide more or less reactive current of the same polarity in response to a control signal. A typical reactance tube circuit of this general type employed for automatic frequency control is described and illustrated in "Radio Engineers Handbook," Terman, published by McGraw-Hill, 1943 at pages 654–656. Such known systems are characterized by the fact that the reactance tube can provide reactive current of only one polarity in the system; that is, the device always appears as either a capacitance or an inductance in the circuit. Moreover, the reactance of these devices is usually not a linear function of the control signal amplitude, but varies in accordance with the plate current-grid voltage characteristics of the tube.

It is an object of the invention to provide a new and improved controllable reactive-current device which may be utilized in a given circuit to supply reactive current of either positive or negative polarity in response to applied control signals.

It is a further object of the invention to provide a new and improved controllable reactive current device in which the effective reactance is a substantially linear function of the amplitude of an applied control signal.

It is an additional object of the invention to provide a new and improved controllable reactive-current device suitable for phase and/or frequency modulation of an oscillator.

It is another object of the invention to provide a controllable reactive-current device which is equally suitable for controlling the phase of a passive signal-translating network.

It is a corollary object of the invention to provide a new and improved controllable reactive-current device which is relatively simple in construction and expedient of manufacture.

A controllable-reactive-current device constructed in accordance with the invention comprises a reactance tube including means for projecting a stream of electrons along a predetermined discharge path, an output electrode system including a collector electrode positioned to intercept the electron stream, and a control system. The reactance tube must have a substantally triangular control-signal-amplitude vs. collector-current operating characteristic over a predetermined control signal amplitude range. The device further includes a signal source for generating a reference signal and coupling means intercoupling that signal source and the control system of the reactance tube; this coupling means is utilized to apply the reference signal to the control system with a phase shift of approximately ninety degrees. In addition, the device includes means for applying to the reactance tube control system a control signal which is substantially restricted in amplitude to the aforementioned amplitude range; this control signal controls the amplitude and the polarity of reactive reference-signal current drawn by the collector electrode.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1:
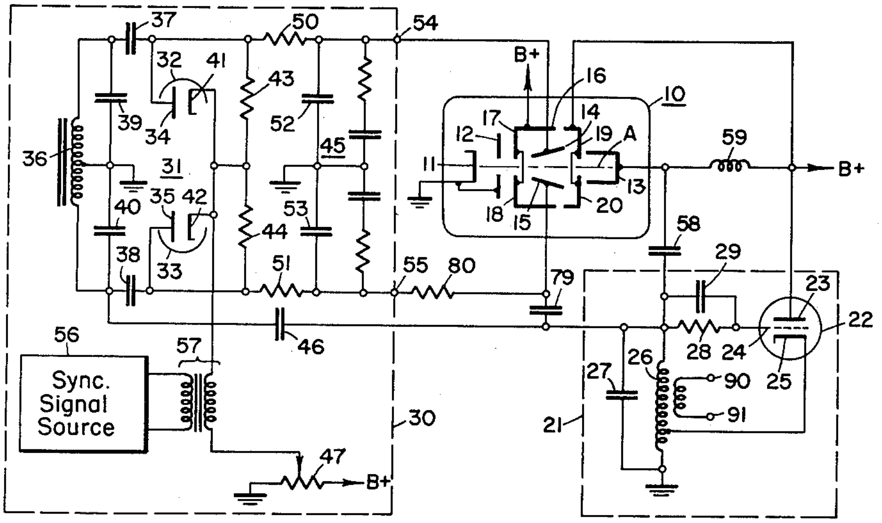
Figure 1 is a schematic diagram of a controllable reactive-current device constructed in accordance with one embodiment of the invention and employed to provide phase and frequency control of an oscillator.

The frequency-control system illustrated in Figure 1 comprises a reactance tube 10 including an electron gun comprising a cathode 11 and a focus electrode 12 which, in the illustrated embodiment, is connected to cathode 11. The electron gun is employed to project a stream of electrons along a predetermined discharge path centered about a reference plane generally indicated by dash line A. A collector electrode 13 is disposed at the opposite end of the discharge path and is positioned to intercept the electron stream. A pair of deflector electrodes 14 and 15 are disposed on opposite sides of reference plane A intermediate the electron gun and collector 13, and an accelerating electrode structure 16 is mounted in substantially encompassing relation to the deflection electrode system. In the illustrated embodiment, electrode 16 constitutes a box-shaped structure having two electrically connected accelerator elements 17 and 18 adjacent focus electrode 12 and separated by a slot through which the discharge path of the tube extends. The reactance tube further includes a second collector comprising a pair of electrically connected collector elements 19 and 20 disposed on opposite sides of the reference path intermediate deflection system 14, 15 and collector 13; collector sections 19 and 20 are separated by a second slot permitting the electron stream to impinge upon collector 13.

The frequency-control system of Figure 1 further includes a signal source 21 for generating a reference signal; signal source 21 in this instance comprises a conventional oscillator including a triode 22 having an anode 23, a control electrode 24, and a cathode 25. A parallel-resonant frequency-determining circuit, comprising an inductance coil 26 connected in parallel with a capacitor 27, is connected between grid 24 and a plane of reference potential here shown as ground; the usual parallel-connected grid leak resistor 28 and grid coupling capacitor 29 are coupled between control grid 24 and resonant circuit 26, 27. Cathode 25 is connected to a center tap on coil 26 to complete the conventional oscillator circuit, usually designated as a Hartley-type oscillator.

A control signal source 30 comprising a phase detector 31 is included in the frequency-control system. Phase detector 31 comprises a pair of diodes 32 and 33 having their respective anodes 34 and 35 coupled together by a balanced input circuit comprising an inductance 36 coupled to anodes 34 and 35 respectively by a pair of coupling capacitors 37 and 38. The electrical center of inductance 36 is connected to ground and a pair of tuning capacitors 39 and 40 are connected in parallel with the two coil sections. The cathodes 41 and 42 of diodes 32 and 33 are connected to each other; a pair of load resistors 43 and 44 are connected to anodes 34 and 35 respectively and are returned to the diode cathode. A low-pass filter network 45, comprising a pair of resistors 50 and 51 connected to ground through a pair of capacitors 52 and 53 respectively and a series R–C circuit connected in parallel with each of capacitors 52 and 53, is connected across the two diodes of the phase detector. The opposite sides of the filter network, comprising terminals 54 and 55, are electrically connected to deflectors 14 and 15 of reactance tube 10, and a synchronizing signal source 56 is coupled to phase detector cathodes 41, 42 by means of a coupling transformer 57. One terminal of the secondary winding of transformer 57 is connected to D.-C. source B+ by a variable bleeder resistor 47 to provide positive operating bias potential for the deflectors 14, 15. The anode input circuit comprising coil 36 is connected through a capacitor 46 to oscillator tank circuit 26, 27 to provide for push-pull application of the reference signal developed by oscillator 21 to the phase detector with a phase shift of ninety degrees. The oscillator tank circuit is also coupled to deflector 15 of tube 10 by a phase-shifting coupling circuit comprising a coupling capacitor 79 and a resistor 80. Reactance tube collector electrode 13 is coupled to frequency-determining circuit 26, 27 of oscillator 21 by a coupling capacitor 58 and it is also coupled to a source of positive unidirectional operating potential B+ through a radio-frequency choke 59. Oscillator anode 23 and accelerator electrode 16 of reactance tube 10 are also connected to D. C. source B+, and the cathode of the reactance tube is grounded.

Figure 4:
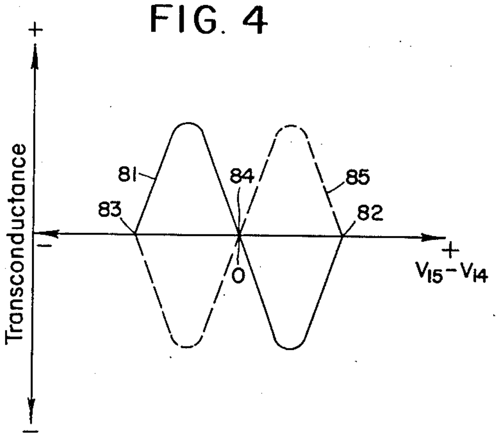
Figure 4 is an explanatory diagram showing transconductance of the reactance tube of Figure 1 as a function of deflection voltage.
Figure 2:
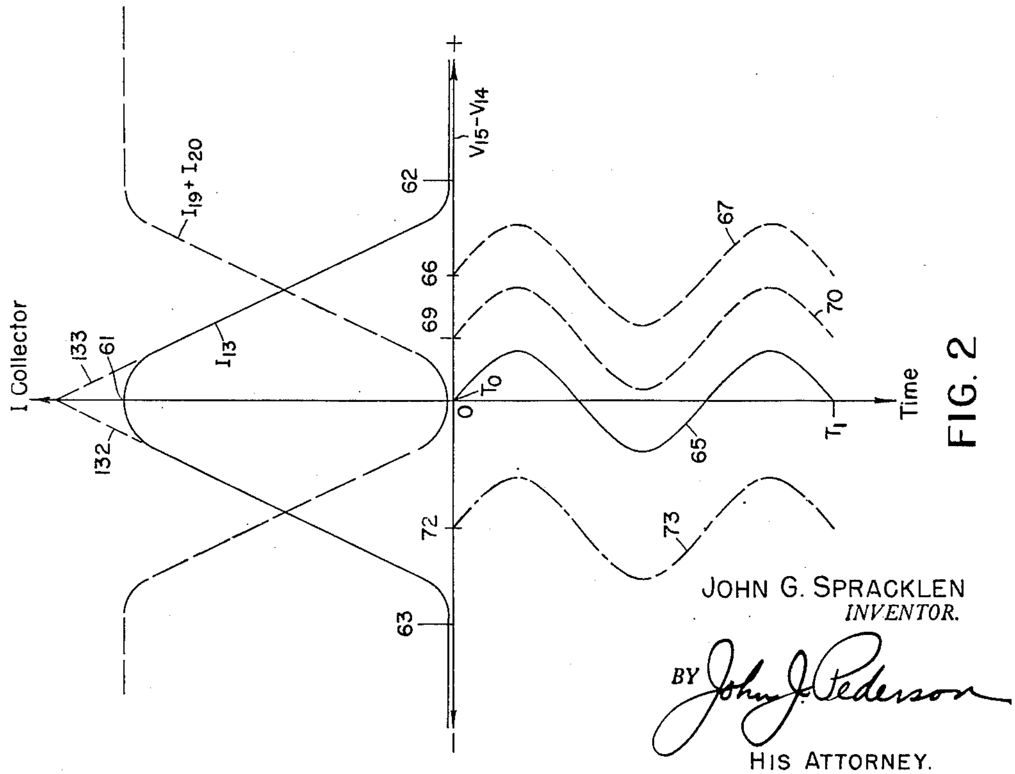
Figure 2 is an explanatory diagram showing certain operating charactertistics of the reactance tube of Figure 1.

In order to reach a complete understanding of the operation of the frequency-control system of Figure 1, it is desirable to first consider the operating characteristics of reactance tube 10 with the aid of the explanatory diagrams of Figures 2–4. When tube 10 is energized, a stream of electrons is projected from cathode 11, focused as it passes through the slots in focus electrode 12 and accelerator 16, and collected by collector electrode 13. In the absence of the signals on deflectors 14 and 15, substantially the entire discharge current is collected by anode 13, although a portion of the discharge current may be collected by collector sections 19 and 20. A suitable deflection signal may be applied to the two deflectors to deflect the electron stream from reference plane A to impinge to a greater extent upon either of collector elements 19 and 20.

In Figure 2, the current drawn by collector 13 is plotted as a function of deflection voltage and is illustrated by solid line 60. As indicated by graph 60, when deflection voltage $V_{15}-V_{14}$ is approximately zero, that is when the potentials of deflectors 14 and 15 are substantially equal, the entire electron stream passes through the slot between collector electrodes 19 and 20 to impinge upon collector 13, producing the current maximum indicated at point 61 on the graph. As the voltage on deflector 15 is increased in a positive direction with respect to the potential of deflector 14, the electron stream is deflected to impinge more and more upon collector element 20 until the current drawn by collector 13 reaches negligible value, as shown at point 62 on curve 60, after which further increases in deflector voltage $V_{15}-V_{14}$ have little or no effect upon collector current distribution. Similarly, by supplying deflector 15 with an operating potential substantially negative with respect to that of electrode 14, the electron beam is deflected toward collector element 19; as this negative potential difference is increased the beam is deflected more and more until substantially all of the beam current is collected by electrode element 19 as indicated at minimum collector current point 63 on the curve. Further increases in deflection voltage $V_{15}-V_{14}$ of a negative polarity have no substantial effect upon the current drawn by collector 13. Consequently, reactance tube 10 exhibits a substantially triangular control-signal-amplitude vs. collector-current operating characteristic over the voltage range 62—63 indicated by $I_{13}$. The curve may be flattened slightly in the region of current maximum point 61 when the electron stream is relatively sharply focused; as a practical matter, this relatively minor flattening of the operating characteristic does not greatly affect the operation of the device, as will be made apparent hereinafter. Of course, virtually all of the electron discharge current not collected by anode 13 is collected by the second collector electrode of the device comprising elements 19 and 20; because these collector elements intercept that portion of the electron stream not passing through to collector 13, they also exhibit a substantially triangular deflection voltage vs. collector current operating characteristic as indicated by dash line $I_{19}+I_{20}$.

Figures 3A, 3B, 3C, 3D, 3E:
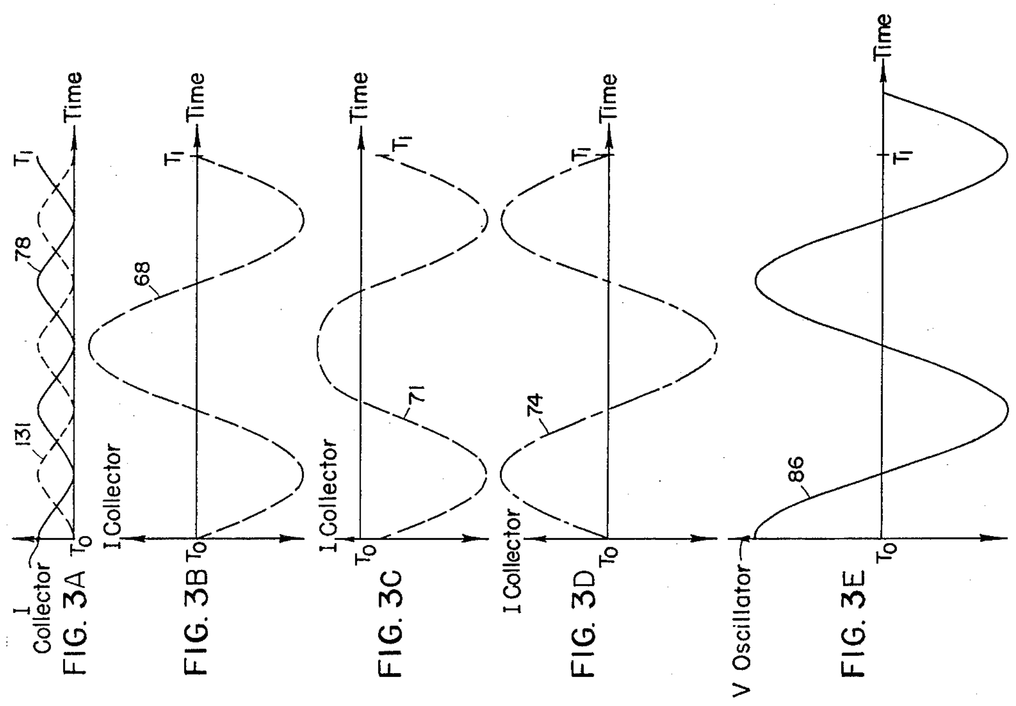
Figures 3A to 3D are explanatory graphs showing the waveform and amplitude of the A. C. component of current drawn by the reactance tube collector electrode under different operating conditions.
Figure 3E shows the reference sigal wavefrom during the same time interval.

With $V_{14}=V_{15}$, reference signal may be applied to deflectors 14 and 15 from oscillator 21 (Figure 1) with relatively small amplitude as indicated by curve 65 in Figure 2. The waveform of the resultant current appearing on collector 13 is illustrated in Figure 3A, which shows only the alternating-current component of the collector current. The time scale in the two figures is the same; between times $T_0$ and $T_1$, 1½ cycles of the deflection signal voltage produce three half-wave current pulses in the collector circuit. These current pulses have no net reactive effect on the tuned circuit of oscillator 21. A D. C. control voltage may then be applied between deflectors 14, 15 to bias the deflection system for operation about a voltage point 66 for which operation of the reactance tube is confined to the linear portion of the collector current operating characteristic between points 61 and 62. Under these operating conditions, the waveform of the A. C. component of current drawn by collector 13 is essentially similar to the input voltage wave shown by dash line 67 in Figure 2 but with a difference of 180 degrees in phase, as illustrated by curve 68 in Figure 3B. At an intermediate operating potential level, indicated at point 69 in Figure 2, an input voltage wave 70 applied to the deflection system produces the collector current A. C. waveform shown in Figure 3C; the waveforms of the collector currents of Figures 3B and 3C are of the same phase, but, as indicated by curve 71, the positive half cycles at intermediate operating voltage 69 are of substantially smaller amplitude than when the deflection system is maintained at operating potential 66. The deflection system may also be biased to an operating point 72 (Figure 2) for operation on the linear portion of characteristic curve $I_{13}$ intermediate points 61 and 63; under these conditions, an input signal voltage wave indicated by dash-dot line 73 produces a collector current output waveform illustrated in Figure 3D by curve 74. A comparison of curve 74 with curves 68 and 71 immediately indicates that the change in operating potential in this instance produces a reversal in the polarity of the collector current waveform. That is, curve 74 is the same as curve 68 except that there is a phase difference of 180 degrees caused by the change in deflection-system operating conditions.

Figure 4 illustrates the operating characteristics of tube 10 in a different manner; in this figure, the transconductance of the deflection-control system with respect to collector electrode 13 is plotted as a function of deflection voltage. As indicated by curve 81, the transconductance is negligible for relatively large negative values of deflection voltage $V_{15}-V_{14}$. At a deflection voltage 83 corresponding to voltage 63 in Figure 2, the transconductance begins to increase sharply at a linear rate, reaches a maximum, and then decreases linearly with further increases in control voltage $V_{15}-V_{14}$. As the deflection voltage approaches zero at point 84, the transconductance decreases to zero. Starting at point 84, increases in the deflection voltage in a positive direction produce a linear increase in transconductance; in this instance, however, the system exhibits a negative transconductance as opposed to the positive transconductance obtained for negative deflection voltages. With further increases in positive deflection voltage, the transconductance again decreases to approximately zero at a deflection potential 82 corresponding to control voltage 62 in Figure 2. Thus, considering collector electrode 13 in conjunction with the deflection-control system, the reactance tube exhibits a transconductance vs. control-signal-amplitude operating characteristics which reverses in polarity over the predetermined control signal amplitude range indicated by limiting voltages 82 and 83. Of course, since the operating characteristic of the second collector electrode comprising collector elements 19 and 20 is supplementary to that of collector 13, the transconductance with respect to second collector 19, 20 also reverses in polarity over the same operating range; the transconductance with respect to collector elements 19 and 20 is illustrated by dash line 85 in Figure 4.

With these operating characteristics in mind, an understanding of the complete operation of the frequency-control system of Figure 1 is easily obtained. The circuit is placed in operation and the operating potentials are adjusted to bias the deflectors 14, 15 at the middle of the useful operating range 62—63 (Figure 2). A reference signal generated by oscillator 21 is shifted ninety degrees in phase and applied to the deflection-control system by means of coupling circuit 79, 80, the amplitude of the applied reference signal being restricted to a value substantially smaller than the useful operating range. The phase-shifted reference signal input to the reactance tube may be considered as represented by curve 65 of Figure 2 and, under these conditions, the collector current drawn by electrode 13 comprises the half-cycle current pulses of relatively small amplitude shown by line 78 in Figure 3A. This A. C. portion of the collector signal is paralleled with frequency-determining circuit 26, 27, since collector 13 is coupled to the tank circuit by capacitor 38 for signal frequencies. Thus, the signal represented by curve 78 is effectively added to the oscillator reference signal, which is illustrated by curve 86 of Figure 3E. The collector signal does not tend to vary the phase or frequency of the oscillator, since it contributes equally to alternate half cycles of the oscillator signal; in effect, therefore, under these operating conditions reactance tube 10 draws no reactive current. Of course, the collector signal tends to modify the waveform of the oscillator output signal slightly, but in this respect the system is no different from any conventional reactance tube circuit.

The reference signal from oscillator 21 is also applied to phase detector 31. In the phase detector, which is quite conventional in construction, the reference signal is compared in phase and frequency with a comparison signal from source 56. When the oscillator is operated in phase and frequency synchronism with the comparison signal from source 56, the effective output of the phase detector is balanced and no potential difference is established between terminals 54 and 55; accordingly, the operation of reactance tube 10 is not changed and continues as described above. When the two signals being compared are not properly phase-synchronized, however, a potential difference is developed between terminals 54 and 55, and deflection system 14, 15, may, for example, be biased to operating point 66 (Figure 2). When these conditions obtain, the A. C. component of the collector signal appearing in shunt with tank circuit 26, 27 is represented by curve 68 of Figure 3B. This collector signal is of substantial amplitude and leads oscillator signal 86 by ninety degrees. Thus, reactance tube 10 draws a substantial current and that current is reactive as compared with the reference signal.

Because the discharge path of reactance tube 10 is shunted across the frequency-determining circuit of the oscillator, the phase and frequency of the oscillator are varied by the change in polarity and amplitude of the current drawn by the reactance tube. The changed operating condition results in a change in the control potential appearing between output terminals 54 and 55 of phase detector 31, and the system may stabilize in operation at voltage point 69 (Figure 2) with reactance tube 10 continuing to draw reactive current of the same polarity as indicated by dash line 71 of Figure 3C but with substantially reduced effective amplitude. Of course, changes in the frequency and/or phase of the comparison signal from source 56 or of the reference signal from oscillator 21 may cause the control potential between phase detector terminals 54 and 55 to change in polarity. When this occurs, reactance tube 10 is driven to operation at some point on the other side of the characteristic curve 60 (Figure 2) and the polarity of the reactive current drawn by tube 10 is reversed.

The frequency-control system illustrated in Figure 1 may be employed in many different environments; a typical application is presented by the color-reference signal generator of a color television receiver. In such a receiver, it is necessary to generate a color-reference signal of stable frequency which is locked in phase and frequency to a received color-synchronizing signal. In such a receiver, oscillator 21 is employed to generate the reference signal, which may be supplied to other portions of the receiver by an output circuit comprising a pair of terminals 90 and 91. The reference signal is supplied to phase detector 31, where it is compared in phase and frequency with a received color-synchronizing signal applied to the phase detector from signal source 56. The output voltage or control signal appearing between terminals 54 and 55 of the phase detector determine the amount of reactive current drawn by tube 10 and thus controls the phase and frequency of the reference signal developed across oscillator terminals 90 and 91.

Figure 5:
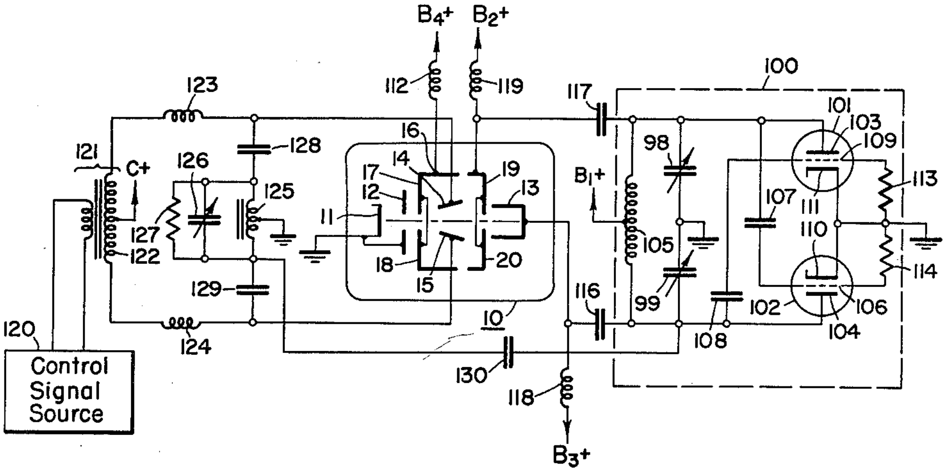
Figure 5 is a schematic diagram of another embodiment of the invention employed in a frequency-modulation system.

In Figure 5, another embodiment of the invention comprising a frequency-modulation system for a transmitter or other similar apparatus is illustrated. In this system, a reactance tube 10 substantially similar in construction with the reactance tube of Figure 1 is utilized to control frequency of a balanced oscillator circuit 100. Oscillator 100 includes a pair of triodes 101 and 102; the anodes 103 and 104 of tubes 101 and 102 respectively are coupled to each other by an inductance coil 105 and the electrical center of coil 105 is connected to a source of positive unidirectional operating potential $B_1+$. A pair of tuning capacitors 98 and 99 are connected in series with each other and in parallel with coil 105, the common connection between the two capacitors being grounded. The control electrode 106 of tube 102 is coupled to anode 103 of tube 101 by a capacitor 107; similarly, a second coupling capacitor 108 interconnects the grid 109 of tube 101 with anode 104 of tube 102. The cathodes 110 and 111 of tubes 102 and 101 respectively are connected to each other and grounded. Control electrode 109 is connected to ground through a bias resistor 113 and control grid 106 is grounded through a bias resistor 114. It will be recognized that oscillator circuit 100 comprises a conventional balanced oscillator including a frequency-determining circuit comprising coil 105 and the two tuning capacitors 98, 99.

One side of the frequency-determining circuit of oscillator 100 is coupled to collector electrode 13 of tube 10 by a coupling capacitor 116; the other side of the oscillator tank circuit is coupled to the second collector electrode of tube 10, comprising collector elements 19 and 20, by means of a coupling capacitor 117. Collectors 13 and 19, 20 are connected to a D. C. operating potential source $B_2+$ by a pair of choke coils 118 and 119 respectively; accelerator electrode 16 is connected to an additional D. C. source $B_3+$ through a choke 112. D. C. sources $B_1+$, $B_2+$ and $B_3+$ may comprise independent sources of operating potential; on the other hand, if the necessary operating voltages are of the same value a single B+ source may be employed or different operating voltages may be obtained by a potentiometer coupled across a single D. C. source if desired.

The modulator of Figure 5 further includes a control signal source 120 which may, for example, comprise a source of audio-frequency signals where the modulator is utilized for FM broadcasting. Control source 120 is coupled to the primary of a coupling transformer 121; one side of the secondary winding 122 of transformer 121 is connected through a radio-frequency choke coil 123 to deflector 14 of tube 10 and the other end of winding 122 is connected through a second choke coil 124 to deflector 15 of the reactance tube. An input circuit comprising the parallel-connected combination of an input inductance 125, a tuning capacitor 126 and a damping resistor 127 is coupled across deflectors 14 and 15 by means of a pair of coupling capacitors 128 and 129, the center of coil 125 being grounded. Oscillator 100 is also coupled to the input circuit by means of a coupling capacitor 130 intercoupling one end of oscillator coil 105 with one end of input inductance 125. Deflector bias may be provided by a source C+ connected to the electrical center of coil 122.

The operation of the modulator circuit illustrated in Figure 5 is in most respects quite similar to that of the stabilized oscillator system of Figure 1. Oscillator 100 generates a reference signal which is shifted ninety degrees in phase and applied in push-pull manner to deflectors 14 and 15 of reactance tube 10 through the coupling circuit comprising capacitor 130 and the input circuit comprising circuit elements 125—129. If no control potential is supplied to the system from source 120, the reactance tube provides an output signal current on collector 13 having a waveform of the type illustrated by curve 78 of Figure 3A. Under these conditions, the output signal current drawn by the second collector electrode comprising collector elements 19 and 20 is of the form illustrated by dash line 131 in Figure 3A. Consequently, and because the two collectors of the reactance tube are connected in push-pull to resonant circuit 98, 99, 105, the reactance tube does not substantially affect the oscillator phase or frequency.

When a control signal is applied between deflectors 14 and 15 from signal source 120, tube 10 draws reactive current as described above in connection with Figure 2 and Figures 3B–3D, depending upon the amplitude and polarity of the applied signal. This reactive signal current is effectively paralleled with the frequency-determining circuit of oscillator 100 and is in balanced relation thereto by virtue of the balanced coupling to the two collector electrodes 13 and 19, 20 provided by capacitors 116 and 117. Consequently, the control signal from source 120 effectively modulates the frequency of the oscillator. Essentially linear modulation may be obtained, as evidenced by the generally linear operating characteristics 60 and 64 of the two collector electrodes of tube 10 (Figure 2). Completely linear modulation would of course be obtained with an operating characteristic exhibiting no flattening in the region of current maximum point 61 as indicated by dash lines 132 and 133 in Figure 2. Although this condition is relatively difficult to obtain in a practical tube, it can be very closely approached, in which case the modulation system constitutes an essentially linear device which introduces virtually no distortion in the frequency-modulation process.

Figure 6:
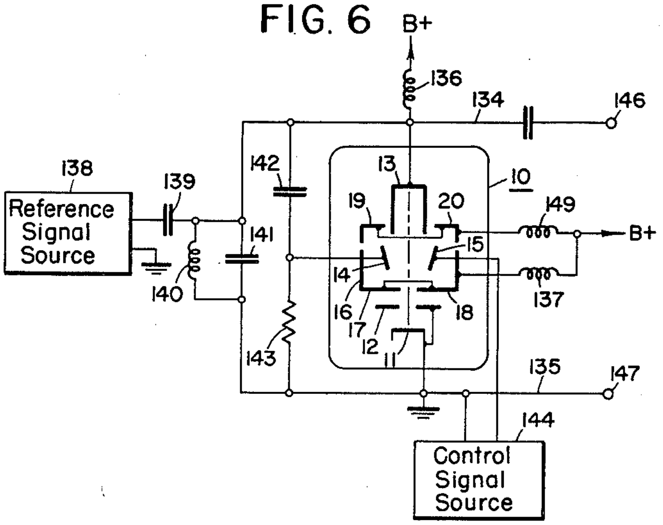
Figure 6 illustrates an additional embodiment of the invention employed for phase control of a passive network.

Figure 6 illustrates a further embodiment of the invention in which the controllable reactive-current device is utilized for phase control of a passive signal-translating network. In this embodiment, collector electrode 13 and cathode 11 of reactance tube 10 are connected to opposite sides of a passive network comprising conductors 134 and 135 respectively. Collector 13 is again connected to an operating potential source B+ by means of a choke coil 136, accelerator electrode 16 is connected to the D. C. source by a choke 137 and collector 19, 20 is connected to B+ by a choke 149. As before, cathode 11 is grounded.

A reference signal source 138 is coupled across passive network 134, 135 by means of an output circuit comprising a coupling capacitor 139 and a tuned input circuit including an inductance coil 140 connected across the transmission line and a tuning capacitor 141 connected in parallel with coil 140. A further coupling circuit comprising the series-connected combination of a coupling capacitor 142 and a resistor 143 is utilized to couple the reference signal to deflector 14 of tube 10; coupling circuit 142, 143 comprises a conventional phase-shifting circuit which shifts the phase of the applied signal by approximately ninety degrees. A control signal source 144, which may comprise a phase detector or other suitable source of control signals, is coupled to deflector 15.

In operation, the circuit of Figure 6 is essentially similar to the frequency-control systems of Figures 1 and 5. As long as no control potential is applied to the deflection system from source 144, reactance tube 10 draws virtually no effective reactive current and does not disturb the phase of the reference signal appearing at the terminals 146 and 147 of transmission line conductors 134 and 135. Application of a control potential to the deflection system of the reactance tube establishes a potential difference between deflectors 14 and 15 and causes reactance tube 10 to draw reactive current, the amplitude and polarity of the reactive current being dependent upon the amplitude and polarity of the applied control signal. In this system, however, the reactance tube does not change the frequency of the applied reference signal, since it is effectively de-coupled from reference signal source 138. Rather, only the phase of the reference signal appearing at the output terminals 146, 147 of the system is varied by the control signal from source 144.

Reactance tubes of the beam-deflection type illustrated in each of the figures are relatively simple and economical in construction, since all of the focus, control and collector electrodes can be easily constructed from sheet metal. For a given tube construction, the operating potential difference between deflectors 14 and 15 required to produce a current maximum on collector 13 (see point 61 in Figure 2) need not be zero; a suitable bias voltage may be applied to the deflectors to center operation of the reactance tube with respect to the requisite triangular operating characteristic. Of course, the reactance tube need not be restricted to electrostatic-control deflection tubes of the type illustrated; rather, any electric discharge device which provides a triangular control-signal-amplitude vs. collector current operating characteristic of the type illustrated in Figure 2 may be employed.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A controllable reactive-current device comprising: a reactance tube comprising means for projecting a stream of electrons along a predetermined discharge path, an output electrode system including a collector electrode positioned to intercept said electron stream, and a control system, said reactance tube having a substantially triangular control-signal-amplitude vs. collector-current operating characteristic over a predeterimned control signal amplitude range; a signal source for generating a reference signal; coupling means, intercoupling said signal source and said reactance tube control system, for applying said reference signal to said control system with a phase shift of approximately ninety degrees; and means for applying a control signal, substantially restricted in amplitude to said predetermined range, to said control system to control the amplitude and polarity of reactive reference-signal current drawn by said collector electrode.

2. A controllable reactive-current device comprising: a reactance tube comprising means for projecting a stream of electrons along a predetermined discharge path, an output electrode system including a collector electrode positioned to intercept said electron stream, and a control electrode system, said reactance tube having a substantially triangular control-voltage vs. collector-current operating characteristic over a predetermined control voltage amplitude range; a signal source for generating a reference signal; coupling means, intercoupling said signal source and said reactance tube control electrode system, for applying said reference signal to said control electrode system with an amplitude substantially smaller than said control signal amplitude range and with a phase shift of approximately ninety degrees; and means for applying a control signal voltage, substantially restricted in amplitude to said predetermined range, to said control system to control the amplitude and polarity of reactive reference-signal current drawn by said collector electrode.

3. A controllable reactive-current device comprising: a reactance tube comprising means for projecting a focused stream of electrons along a predetermined discharge path centered about a reference axis, an output electrode system including a first collector electrode positioned to intercept said electron stream and a pair of additional collector electrode elements positioned on opposite sides of said reference axis, and a deflection system for deflecting said electron stream from said reference axis across said output electrode system, said reactance tube having a substantially triangular deflection-signal-amplitude vs. collector-current operating characteristics over a predetermined control signal amplitude range; a signal source for generating a reference signal; coupling means, intercoupling said signal source and said reactance tube deflection system, for applying said reference signal to said deflection system with a phase shift of approximately ninety degrees; and means for applying a control signal, substantially restricted in amplitude to said predetermined range, to said deflection system to control the amplitude and polarity of reactive reference-signal current drawn by said collector electrode.

4. A controllable reactive-current device as set forth in claim 3 in which said two additional collector electrode elements are interconnected to form a second collector electrode having a substantially triangular deflection-signal-amplitude vs. collector-current operating characteristic substantially supplementary to the operating characteristic of said first collector electrode and in which said control signal controls the amplitude and polarity of reactive reference-signal current drawn by both of said collector electrodes.

5. A controllable reactive-current device comprising: a reactance tube comprising means for projecting a stream of electrons along a predetermined discharge path, an output electrode system including a collector electrode positioned to intercept said electron stream, and a control system, said reactance tube having a substantially triangular control-signal-amplitude vs. collector-current operating characteristic over a predetermined control signal amplitude range; an oscillator for generating a reference signal of predetermined frequency; coupling means, intercoupling said oscillator and said control system, for applying said reference signal to said deflection system with a phase shift of approximately ninety degrees; and means for applying a control signal, substantially restricted in amplitude to said predetermined range, to said control system to control the effective frequency and phase of said reference signal by controlling the amplitude and polarity of reactive reference-signal current drawn by said collector electrode.

6. A frequency control system comprising: a reactance tube comprising means for projecting a focused stream of electrons along a predetermined discharge path centered about a reference axis, an output electrode system including a first collector electrode positioned to intercept said electron stream and a pair of collector electrode elements disposed on opposite sides of said reference axis, and a deflection system for deflecting said electron stream from said reference axis across said output electrode system, said reactance tube having a substantially triangular deflection-signal-amplitude vs. collector-current operating characteristic over a predetermined control signal amplitude range; an oscillator, including a frequency-determining circuit connected in parallel with said reactance tube discharge path, for generating a reference signal of predetermined frequency; coupling means, intercoupling said oscillator and said deflection system, for applying said reference signal to said control system with a phase shift of approximately ninety degrees and an amplitude substantially smaller than said predetermined amplitude range; and means for applying a control signal to the deflection system to control the effective phase and frequency of said reference signal by controlling the amplitude and polarity of reactive reference-signal current drawn by said collector electrode.

7. A frequency control system comprising: a reactance tube comprising means for projecting a focused stream of electrons along a predetermined discharge path centered about a reference axis, an output electrode system including a first collector electrode extending transversely of said reference axis and a second collector electrode comprising two electrically interconnected collector elements disposed on opposite sides of said first collector electrode, and a deflection system for deflecting said electron stream from said reference axis across said output electrode system, said collector electrodes having substantially supplementary triangular deflection-signal-amplitude vs. collector-current operating characteristics over a predetermined deflection signal amplitude range; an oscillator, including a frequency-determining circuit connected in balanced parallel relationship with said two collector electrodes, for generating a reference signal of predetermined frequency; coupling means, intercoupling said oscillator and said deflection system, for applying said reference signal to said deflection system with a phase shift of approximately ninety degrees and an amplitude substantially smaller than said predetermined amplitude range; and means for applying a control signal, substantially smaller than said amplitude range, to said deflection system to control the effective frequency and phase of said reference signal by controlling the amplitude and polarity of reactive reference-signal current drawn by said two collector electrodes.

8. A controllable reactive-current device comprising: a reactance tube comprising means for projecting a stream of electrons along a predetermined discharge path, an output electrode system including a collector electrode positioned to intercept said electron stream, and a control system, said reactance tube having a transconductance vs. control-signal-amplitude operating characteristic which reverses in polarity within a predetermined control signal amplitude range; a signal source for generating a reference signal; coupling means, intercoupling said signal source and said reactance tube control system, for applying said reference signal to said control system with a phase shift of approximately ninety degrees; and means for applying a control signal, substantially restricted in amplitude to said predetermined range, to said control system to control the amplitude and polarity of reactive reference-signal current drawn by said collector electrode.

References Cited in the file of this patent

UNITED STATES PATENTS

| | | |
|---|---|---|
| 2,569,358 | Overbeck | Sept. 25, 1951 |
| 2,654,071 | Harris | Sept. 29, 1953 |

FOREIGN PATENTS

| | | |
|---|---|---|
| 561,459 | Great Britain | May 22, 1944 |
| 137,677 | Australia | June 26, 1950 |